(12) United States Patent
Saito et al.

(10) Patent No.: US 6,690,538 B1
(45) Date of Patent: Feb. 10, 2004

(54) DISK DRIVE DEVICE AND ACCESS SEQUENCE THEREFOR

(75) Inventors: Tomoaki Saito, Tokyo (JP); Isamu Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 09/661,266

(22) Filed: Sep. 13, 2000

(30) Foreign Application Priority Data

Sep. 30, 1999 (JP) .......................................... 11-279512

(51) Int. Cl.$^7$ ............................................... G11B 5/596
(52) U.S. Cl. ................................................... 360/78.08
(58) Field of Search .......................... 360/78.08, 78.06, 360/75; 711/4, 113

(56) References Cited

U.S. PATENT DOCUMENTS

| | | | | |
|---|---|---|---|---|
| 4,468,730 A | * | 8/1984 | Dodd et al. .................. | 711/113 |
| 5,940,242 A | * | 8/1999 | Lee .......................... | 360/78.08 |
| 6,105,104 A | * | 8/2000 | Guttmann et al. ............. | 711/4 |
| 6,128,154 A | * | 10/2000 | Bang ........................ | 360/77.08 |
| 6,246,537 B1 | * | 6/2001 | Shirane .................... | 360/78.08 |
| 6,470,412 B1 | * | 10/2002 | Kisaka et al. ............... | 711/4 |
| 6,493,171 B2 | * | 12/2002 | Enokida et al. .............. | 360/75 |

FOREIGN PATENT DOCUMENTS

| | | |
|---|---|---|
| JP | 6462886 | 3/1989 |
| JP | 963199 | 3/1997 |
| JP | 963202 | 3/1997 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

A disk drive device including a plurality of disks that are arranged concentrically about a central axis, wherein each of the disks includes a plurality of concentric tracks of different diameters. Each of the disks also includes a top surface and a bottom surface. There are a plurality of cylinders defined by a combination of one of the tracks from each of the disks, wherein each cylinder consists of a plurality of tracks of a single diameter. A plurality of heads are associated with the disks, wherein each of the heads is configured and arranged to access either a top surface or a bottom surface of one of the disks. The present invention also includes an upper level device for issuing access commands directing the heads to access the disks. When an access command is issued that requires sequential data to be accessed on more than one track, an access sequence is followed in which at least two of the top surfaces on different disks of the same cylinder are accessed directly after each other, or, at least two of the bottom surfaces on different disks of the same cylinder are accessed directly after each other.

12 Claims, 12 Drawing Sheets

Fig. 1
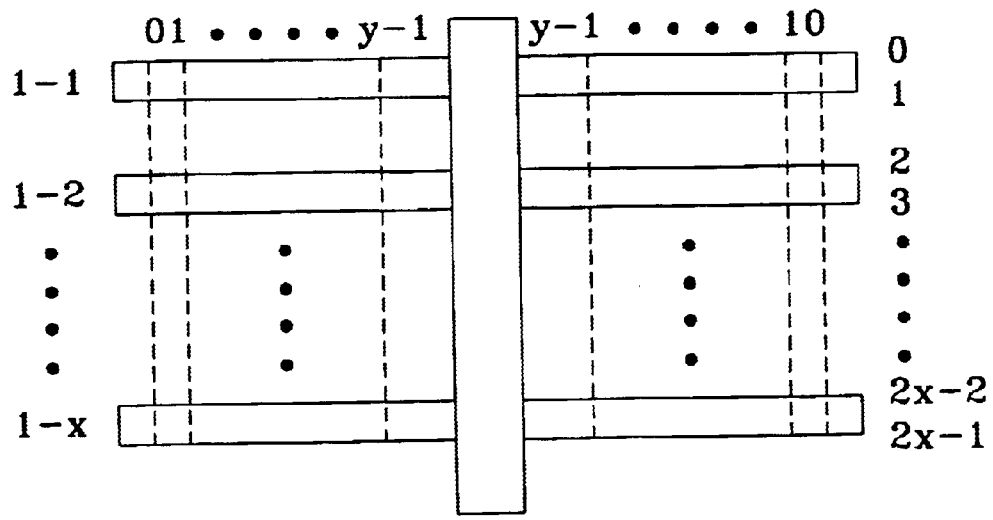
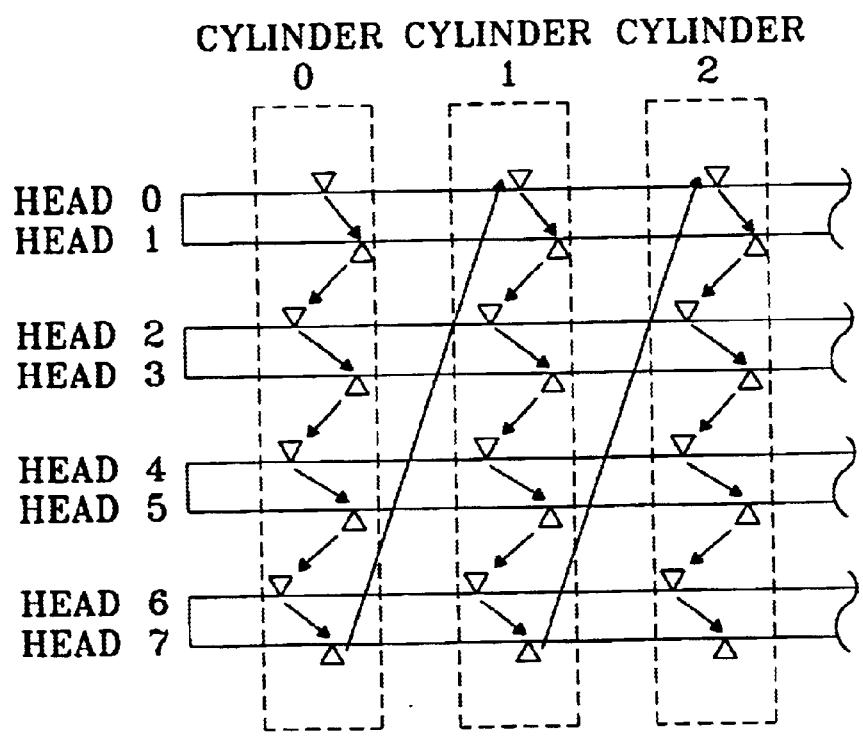
Fig. 2
(PRIOR ART)

Fig. 7

| LBA | CYLINDER | HEAD | PHYSICAL SECTOR |
|---|---|---|---|
| 0 | 0 | 0 | 0 |
| 1 | 0 | 0 | 1 |
| ⋮ | ⋮ | ⋮ | ⋮ |
| 39 | 0 | 0 | 39 |
| 40 | 0 | 2 | 0 |
| ⋮ | ⋮ | ⋮ | ⋮ |
| 79 | 0 | 2 | 39 |
| 80 | 0 | 4 | 0 |
| ⋮ | ⋮ | ⋮ | ⋮ |
| 159 | 0 | 6 | 39 |
| 160 | 0 | 7 | 0 |
| ⋮ | ⋮ | ⋮ | ⋮ |
| 199 | 0 | 7 | 39 |
| 200 | 0 | 5 | 0 |
| ⋮ | ⋮ | ⋮ | ⋮ |
| 359 | 0 | 1 | 39 |
| 360 | 1 | 1 | 0 |
| ⋮ | ⋮ | ⋮ | ⋮ |
| 399 | 1 | 1 | 39 |
| 400 | 1 | 3 | 0 |
| ⋮ | ⋮ | ⋮ | ⋮ |
| 579 | 1 | 7 | 39 |
| 580 | 1 | 6 | 0 |
| ⋮ | ⋮ | ⋮ | ⋮ |
| 619 | 1 | 6 | 39 |
| 620 | 1 | 4 | 0 |
| ⋮ | ⋮ | ⋮ | ⋮ |
| 38399 | 1119 | 7 | 39 |

ADDRESS CONVERSION TABLE

Fig. 11

| LBA | CYLINDER | HEAD | PHYSICAL SECTOR | ZONE |
|---|---|---|---|---|
| 0 | 0 | 0 | 0 | 0 |
| 1 | 0 | 0 | 1 | |
| ⋮ | ⋮ | ⋮ | ⋮ | |
| 39 | 0 | 0 | 39 | |
| 40 | 0 | 2 | 0 | |
| ⋮ | ⋮ | ⋮ | ⋮ | |
| 79 | 0 | 2 | 39 | |
| 80 | 0 | 4 | 0 | 1 |
| ⋮ | ⋮ | ⋮ | ⋮ | |
| 159 | 0 | 6 | 39 | |
| 160 | 0 | 7 | 0 | |
| ⋮ | ⋮ | ⋮ | ⋮ | |
| 199 | 0 | 7 | 39 | |
| 200 | 0 | 5 | 0 | 2 |
| ⋮ | ⋮ | ⋮ | ⋮ | |
| 359 | 0 | 1 | 39 | |
| 360 | 1 | 1 | 0 | 3 |
| ⋮ | ⋮ | ⋮ | ⋮ | |
| 399 | 1 | 1 | 39 | |
| 400 | 1 | 3 | 0 | 4 |
| ⋮ | ⋮ | ⋮ | ⋮ | |
| 579 | 1 | 7 | 39 | 5 |
| 580 | 1 | 6 | 0 | |
| ⋮ | ⋮ | ⋮ | ⋮ | ⋮ |
| 619 | 1 | 6 | 39 | 6 |
| 620 | 1 | 4 | 0 | |
| ⋮ | ⋮ | ⋮ | ⋮ | 12 |
| 38399 | 1119 | 7 | 39 | |

ADDRESS CONVERSION TABLE

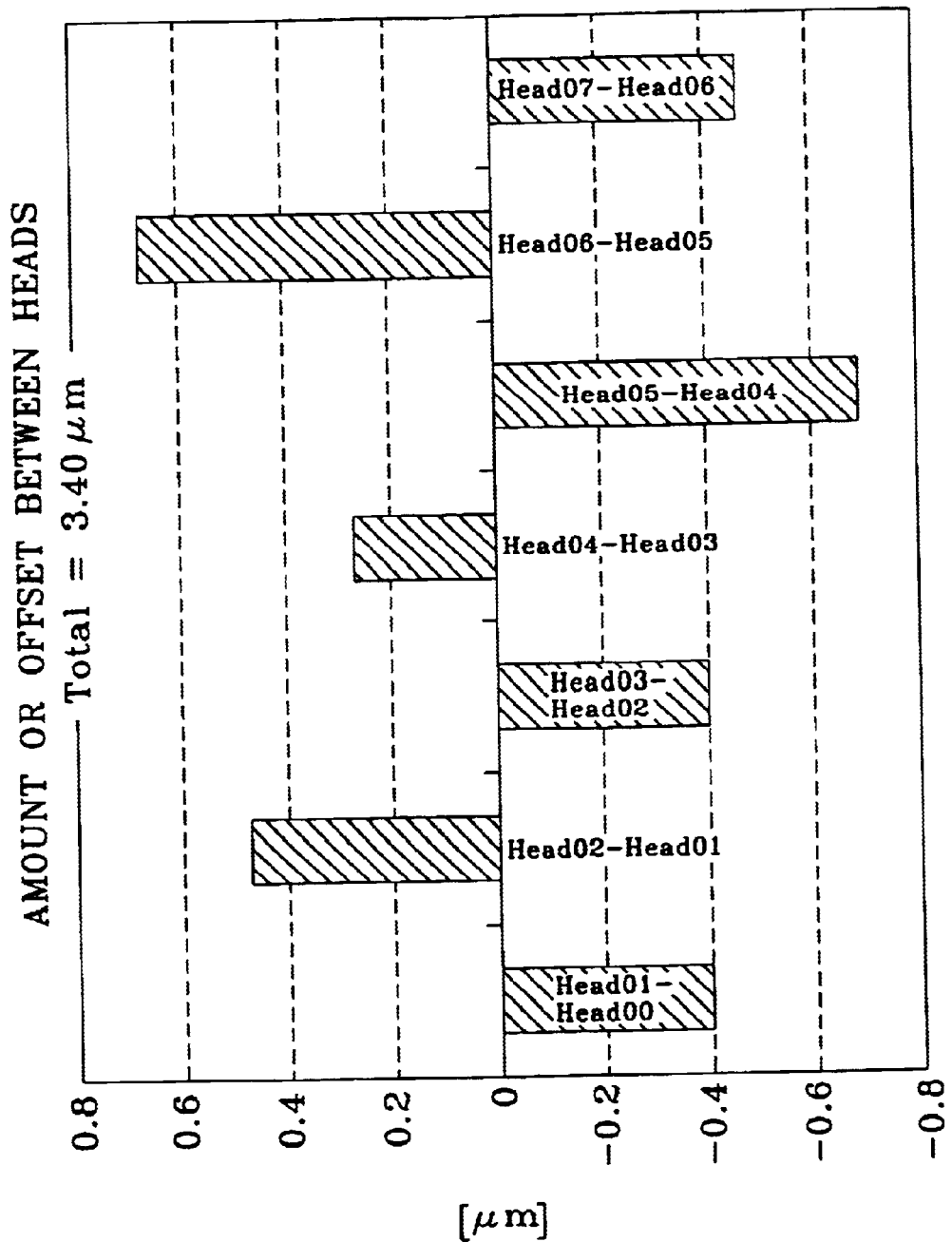

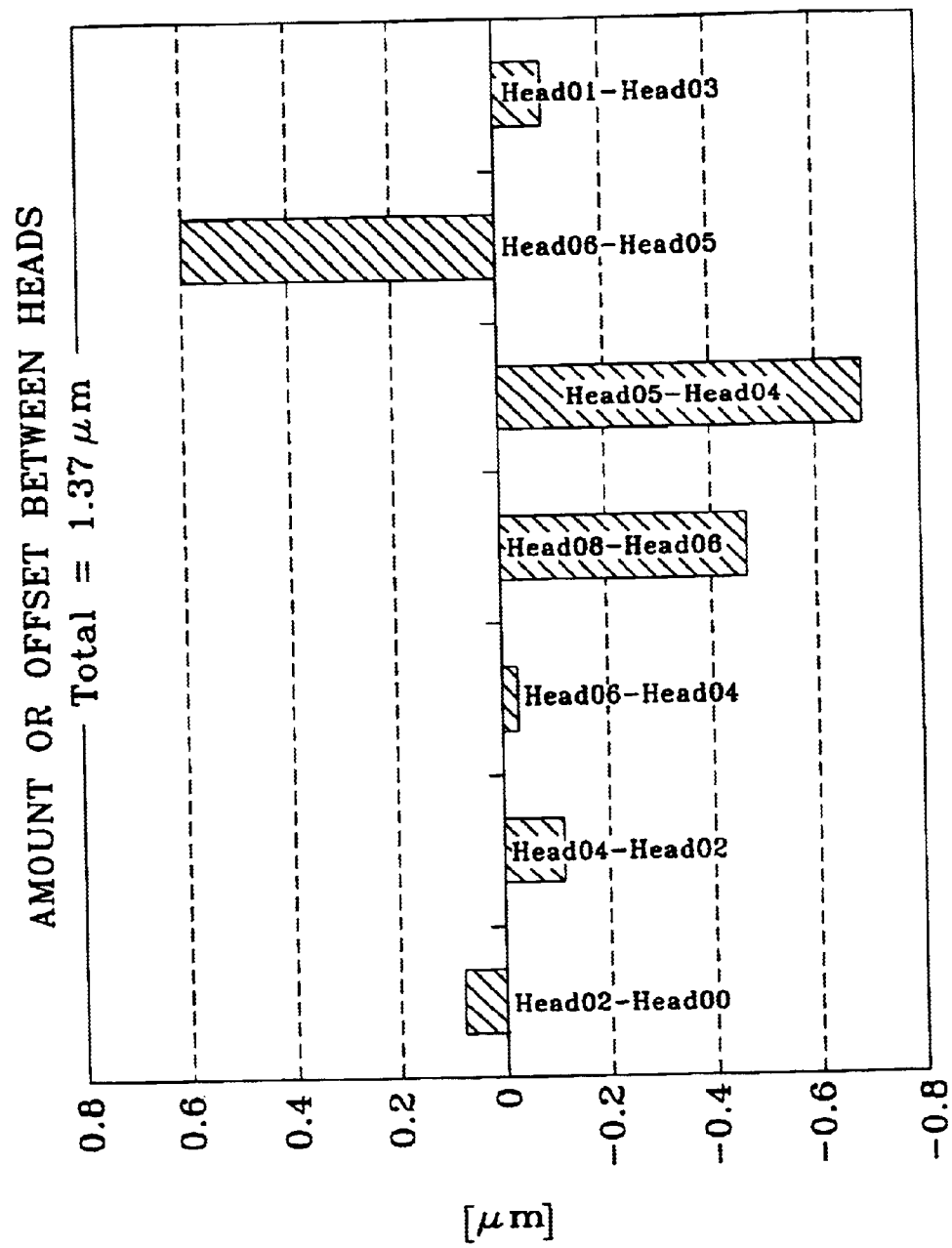

DISK DRIVE DEVICE AND ACCESS SEQUENCE THEREFOR

This invention concerns the control of the head position of a disk drive device. More precisely, it concerns the conversion of the logical address (which is contained in an access command that has been issued by an upper level device) to the physical address on the disk.

BACKGROUND OF THE INVENTION

As the capability of processors and the popularity of multimedia have both increased, there has been a greater demand for faster processing speeds and for larger capacities for disk drive devices (which are the external storage devices for computers). In order to increase the storage capacity of disk drives, a plurality of disks are normally provided in each drive. Each disk drive also includes a plurality of heads for recording or regenerating signals, where one head is provided for each disk recording surface.

In order to identify the position on a disk where data will be recorded, the disk is assigned physical addresses that indicate physical locations on the disk. The locations where data are stored upon the disk are identified by: (1) a sector address that identifies the circumferential location on a track; (2) a cylinder address that identifies the radial location on a disk; and (3) a head address that identifies which recording surface on which of the many disks will be used. In response to a disk access request from an upper level device, a logical address, which is controlled by the upper level device, must be correlated to the physical address on the disk. The disk drive device includes memory reserved for a conversion table that converts the logical addresses into the physical addresses.

FIG. 1 shows a cross-section of a disk. In a disk drive device that has a plurality of disks (x number of disks), the physical addresses may be assigned as indicated in FIG. 1. That is, disks 1-1 to 1-x are stacked on the same axis. The head addresses are assigned in sequence starting from the very top disk, from 0, 1, 2, 3, 4, . . . to 2x–2, 2x–1, as shown in FIG. 1. The cylinder addresses are assigned in sequence beginning from the outer periphery of a disk (from 0, 1, 2, . . . to y–1). In addition, although not illustrated, sector addresses are assigned in the circumferential direction for each track on all recording surfaces. When recording data, if the data is too large to sequentially fit on a single track, another head or another cylinder track is assigned to accept the remainder of the data.

FIG. 2 shows the access sequence for a disk disclosed in the public release of Japanese Laid-Open Patent Number Hei 1-62886. In this example, there are four disks, which means that there are eight recording surfaces (two per disk).

As shown in FIG. 2, within each cylinder, the top surfaces and the bottom surfaces of each disk are alternately accessed in ascending order according to the head address. Thus, for cylinder 0, the heads are accessed in the following order 0, 1, 2, . . . 6, 7. After the final head (head 7) is reached, the top surface (head 0) of the adjacent cylinder will be accessed. As a result, if one sequential string of data does not fit on a single track, the head changes to the next head in the same cylinder, which performs the accessing upon the recording surface that is immediately below the previous recording surface. If the entire string of data cannot fit within that cylinder, the head and the cylinder will change, and accessing begins with the top surface of the adjacent cylinder.

FIG. 3 shows the accessing sequence based on the accessing method disclosed in the public release of Japanese Laid-Open Patent Number Hei 9-63199. In this example there are also four disks, which means that there are eight recording surfaces.

In the example shown in FIG. 3, the accessing sequence is substantially the same as that shown in FIG. 2 (whereby in each cylinder, the top surface and then the bottom surface of each disk are accessed alternately, and after the final head is reached, the adjacent cylinder is accessed). However, in the FIG. 3 example, when the cylinder changes, the head does not change as it does in the FIG. 2 example. Instead, in the FIG. 3 example, the adjacent cylinder on the same recording surface is accessed after the final head on a given cylinder has been accessed. The result is that in even-numbered cylinders, the heads are accessed in ascending order (0, 1, 2, etc.), while in odd-numbered cylinders, the head are accessed in descending order (7, 6, 5, etc.).

FIG. 4 shows the accessing sequence for the disk disclosed in the public release of Japanese Laid-Open Patent Number Hei 9-63202. In this case as well, there are four disks, which means that there are eight recording surfaces.

In the FIG. 4 example, the recording regions are accessed sequentially by cylinder address. Thus, head 0 accesses cylinders 0, 1, 2, etc. in ascending order until finally reaching the final cylinder (cylinder y). At that point, the head changes to head 1, and the recording surface immediately below is accessed, while remaining in cylinder y. Next, the cylinders are accessed by head 1 in descending order, until reaching cylinder 0, at which point the head changes to head 2, where the sequence continues as indicated in the figure. Thus, in general, in the FIG. 4 example, if sequential data does not entirely fit onto one track, the cylinder changes and the adjacent cylinder on the same recording surface is accessed. Further, if the data does not fit within that recording surface, the head changes and the track of the recording surface immediately below, but still within that same cylinder, is accessed.

The Problems that the Present Invention Attempts to Solve

In order to reduce the rotation wait time that accompanies the head movements when a cylinder changes, the sector numbers between tracks are offset and assigned. These offset sector numbers are referred to as the cylinder skew. In addition, in order to also reduce the rotation wait time that accompanies an access that covers different recording surfaces, the sector numbers between tracks are also offset and assigned. These offset sector numbers are referred to as the head skew.

When the access sequence shown in FIG. 2 is utilized, the head changes when moving within a single cylinder, as well as when changing from one cylinder to the adjacent cylinder. The amount of movement that accompanies a head change when changing from one cylinder to an adjacent cylinder can be determined by adding together the track pitch and the relative off-track amount between the head at the very top and the head at the very bottom. The relative off-track amount between different heads will depend on things such as the particular specifications of the disk drive device, the direction in which the disk drive device is installed, the temperature of the environment, and the core offset between the write head and the read head. With the narrow track disks that are recently being used, the relative off-track amount sometimes exceeds the track pitch. For this reason, when using the access sequence shown in FIG. 2, the cylinder skew is established by considering the worst case value of the relative off-track amount for the track pitch plus head 0 and the final head (head 7). As a consequence, if there is a large amount of variation in the relative off-track amounts, the amount of head movement that accompanies a cylinder change will be very large. In addition, a large cylinder skew must be established, which becomes a hindrance to increasing the transfer rate of the disk drive device.

In systems using the access sequence shown in FIG. 3, no head change accompanies a cylinder change because the cylinder change takes place without a change in the recording surface. As a result, the amount of head movement when the cylinder changes is fixed, when the servo data is recorded, to be within the range of the track pitch accuracy, and this is shorter than the access sequence shown in FIG. 2. However, since the head changes for each track change within the cylinder in FIG. 3 (as it does in FIG. 2), it is easy for head movement caused by the relative amount of offset of the heads to occur. Therefore, if there is a large amount of variation in the amount of relative offset of the head, the total amount of head movement will be greater, and a large head skew will have to be established. For this reason, no significant increase in the transfer rate can be anticipated by using the access sequence shown in FIG. 3, when compared to using the access sequence shown in FIG. 2.

Turning now to the access sequence shown in FIG. 4, here the cylinders are assigned to be accessed in sequence on the same recording surface. Because of this, in the majority of changes from one cylinder to the next cylinder during the recording process, there is not a change of head. The amount of head movement is fixed to be within the range of accuracy of the track pitch when the servo data is recorded. In addition, since the changing of the heads takes place in recording surface units (i.e., after all cylinders on a particular recording surface have been accessed), there are relatively fewer head changes (when compared to the sequences of FIGS. 2 and 3), reducing the impact of the relative offset of the heads. On the other hand, during the reading process, when a random access read process takes place within the range of a certain capacity, the head seek range will become greater than that discussed above, depending on the method of head movement, and this will lower the random access read performance. Accordingly, although the recording process of the FIG. 4 example is much faster than that of the FIG. 3 example, the FIG. 4 example has a longer access time during the read operation.

For these reasons discussed above, the first objective of this invention is to offer a disk drive device in which a high level of data transfer efficiency can be obtained.

Another objective of this invention is to shorten the head skew when the heads change.

These and other objects of the present invention are discussed or will be apparent from the following description of the present invention.

SUMMARY OF THE INVENTION

In the case of a magnetic head in which an MR element is used as the read head, the masks used to form the MR element are different for those used as the upper heads (which are used to record or regenerate on the top surface of the disk) than for those masks used for the lower heads (which are used to record or regenerate on the bottom surface of the disk). Additionally, the amount of offset in the center line of the read head and the write head is also different between the upper heads and lower heads. Further, the relative off-track amount between an upper head and a lower head is greater than the relative off-track amount for either the upper heads alone or for the lower heads alone. In the present invention, attention was directed to these factors in order to increase the data transfer rate by devising an improved head changeover sequence.

In order to resolve the problems indicated above, the preferred embodiment of the disk drive device of the present invention utilizes an accessing sequence which begins where only the top surfaces, within a single cylinder, of a plurality of disks are accessed. Next, only the bottom surfaces, within the same single cylinder, of a plurality of disks are accessed. After the bottom surfaces of that single cylinder have been accessed, the bottom surfaces of an adjacent cylinder are accessed, followed by the top surfaces of that same adjacent cylinder. According to this sequence, most head changes will take place between a series of upper heads or between a series of lower heads, which have a relatively small amount of relative offset. For this reason, the amount of head movement that accompanies a head change is minimized, which allows the head skew to be set to a relatively small value. As a result, the present invention accommodates an increase in the rate of data transfer. In particular, by either accessing all of the top surfaces of the plurality of disks in a single cylinder, or by accessing all of the bottom surfaces of the plurality of disks in that same cylinder, there will only be one head change, from the upper head to lower head, which increases the rate of data transfer.

Furthermore, since the access destinations of the sequential data will be assigned continuously across adjacent cylinders that are on the same recording surface, there is no head change for a cylinder change. Accordingly, the distance the head moves is fixed due to the range of the track pitch accuracy, restricting the cylinder skew to a minimum. In addition, when there is a head change, the cylinder skew can be shortened since it is no longer necessary to take into account the relative offset between the currently selected head and the head to which the change will be made. These factors also contribute to increases in the data transfer rate.

An additional feature of the present invention relates to the fact that, in the preferred embodiment, the recording surface of the disk is divided into a plurality of zones in the radial direction, and the number of disk rotations per minute or the number of recording cycles may be varied for each zone. Doing this allows the difference in cycle speeds between the outer circumference and the inner circumferences to be absorbed, which allows the recording surfaces to be used more efficiently. In this case, however, if there is an even number of cylinders within each zone, there will not be an inversion in the relationship between the physical cylinders and the logical cylinders (i.e., when moving from one zone to the next, odd numbered logical addresses will continue to be associated with odd numbered physical addresses, and vice versa).

Briefly, the present invention relates to a disk drive device that includes a plurality of disks that are arranged concentrically about a central axis, wherein each of the disks includes a plurality of concentric tracks of different diameters. Each of the disks also includes a top surface and a bottom surface. There are a plurality of cylinders defined by a combination of one of the tracks from each of the disks, wherein each cylinder consists of a plurality of tracks of a single diameter. A plurality of heads are associated with the disks, wherein each of the heads is configured and arranged to access either a top surface or a bottom surface of one of the disks. The present invention also includes an upper level device for issuing access commands directing the heads to access the disks. When an access command is issued that requires sequential data to be accessed on more than one track, an access sequence is followed in which at least two of the top surfaces on different disks of the same cylinder are accessed directly after each other, or, at least two of the bottom surfaces on different disks of the same cylinder are accessed directly after each other.

BRIEF DESCRIPTION OF THE DRAWINGS

Preferred embodiments of the present invention are described herein with reference to the drawings wherein:

FIG. 1 shows the physical address allocations on a disk;

FIG. 2 shows one example of a prior art accessing sequence for head movement;

FIG. 7 shows the first embodiment of the address conversion table of the present invention;

FIG. 11 shows the second embodiment of the address conversion table of the present invention;

FIG. 13 is a bar graph that shows the relative amounts of offset between heads using a prior art head movement method; and FIG. 14 shows the amount of offset between heads using the head movement method of this invention.

DETAILED DESCRIPTION OF THE PRESENT INVENTION

Figure 5:
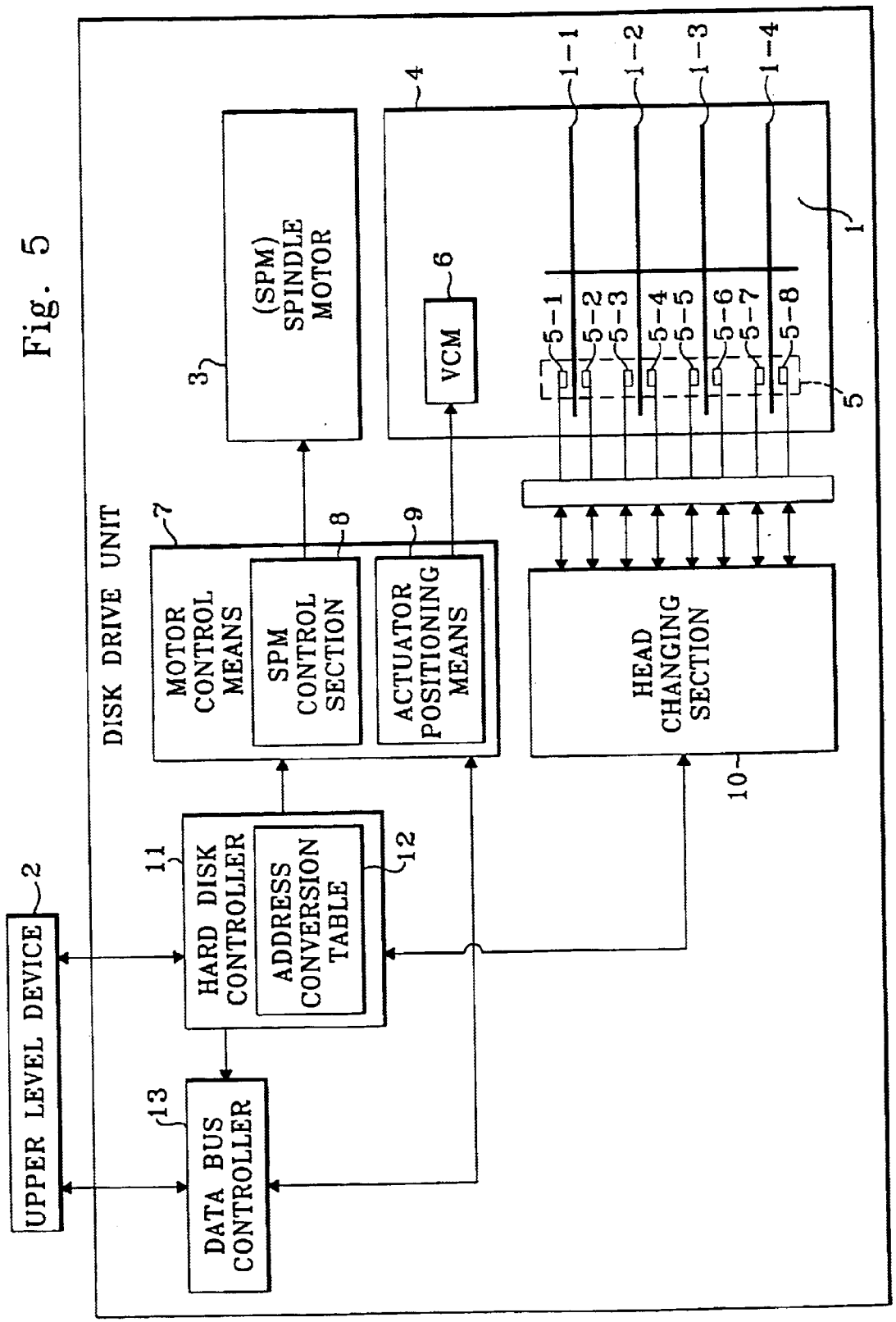
FIG. 5 shows a functional block diagram of the disk drive device of the present invention.

FIG. 5 shows a block diagram of one embodiment of a disk drive device 1 of the present invention. In the examples of the present invention described herein, the disk drive device includes four disks (numbered as disks 1-1 to 1-4), which means that the combined disk drive unit has eight recording surfaces. However, it should be noted that drives with either more disks or less disks are also contemplated as being within the scope of the invention, and that a drive with four disks have been chosen for the purposes of illustration only.

As shown in FIG. 5, the head addresses 0 to 7 go from the top surface of the top disk (disk number 1-1), to the bottom surface of the bottom disk (disk number 1-4), and are designated sequentially by the numbers 0 to 7. In the preferred embodiment, 1200 cylinders have been assigned. The cylinder addresses are preferably assigned in sequence from the outer edge of the disks to the radial centers of the disks using the numbers 0 to 1199. In addition, each track on each recording surface is preferably divided into forty sectors. The sector addresses are assigned with numbers from 0 to 39 along the circumferential direction of the tracks. These assignments result in a total of 384,000 sectors in the combined disk drive unit 1.

A spindle motor 3 rotates the disks of the combined disk drive unit 1 on a single axis. Because there are eight recording surfaces in the disk drive unit 1, there are eight heads 5 (one for each recording surface). These heads are numbered as head 5-1, head 5-2 . . . through head 5-8. Each of heads 5-1 to 5-8 reads data from and/or writes data to its associated recording surface, which is designated by a head address number between 0 and 7. Each of the heads 5-1 through 5-8 preferably includes an MR head as the reading head and an inductive head as the writing head.

An actuator 4 supports the heads 5-1 through 5-8 in a manner that allows the heads to rotate about a single axis. The rotary movement of the actuator allows the heads 5-1 through 5-8 to move along the radial direction of the disks. The actuator 4 is driven by a VCM 6, as known to those of ordinary skill in the art.

A motor control means 7 has an SPM control section 8 that controls the rotational speed of the spindle motor 3, as well as an actuator positioning means 9 that controls the VCM 6 so that the heads 5 are properly positioned on the target tracks on the disks.

An upper level device 2 is used to issue access commands to the combined disk drive unit 1. Normally, the upper level device 2 consists of a personal computer, although other devices may also be utilized.

Additionally, a head changing section 10 is used to select the head that corresponds to the physical address specified from among heads 5-1 to 5-8. A hard disk controller 11 controls both an SPM control section 8 and an actuator positioning means 9 in response to commands from the upper level device 2.

The present invention also includes an address conversion table 12, which consists of, for example, an SRAM or a flash memory that correlates the logical address that is designated by an access command issued by the upper level device 2 with a physical address that is on the combined disk drive unit 1. A data bus controller 13 relays data between the head changing section 10 and the upper level device 2, based on the commands from the hard disk controller 11.

Figure 6:
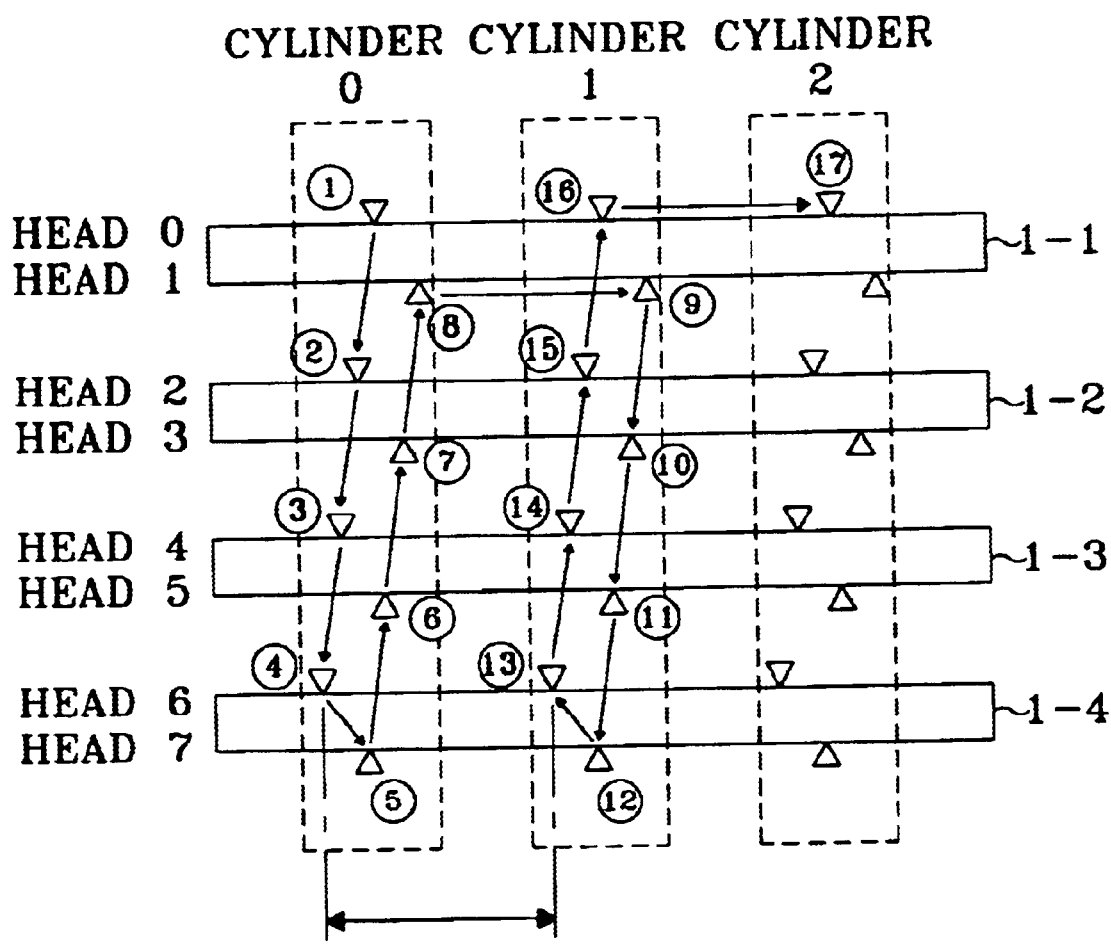
FIG. 6 shows the head changing sequence of the present invention.

One important aspect of the present invention is shown in FIG. 6, which depicts a preferred embodiment of the access sequence of the disk drive device. In this invention, in general, the accessing priority goes from the sector, to the head, and then to the cylinder. Briefly, if the sequential data exceeds one sector address, a changing of the heads takes place within the same cylinder. The head that corresponds to the recording surface of the head address where the head change will take place will be selected from among heads 5-1 to 5-8 (FIG. 5).

In this invention, either the top recording surface group (head numbers 0, 2, 4 and 6) or the bottom recording surface group (heads numbers 1, 3, 5 and 7) will be accessed first. The other group will be accessed next.

FIG. 6 shows the preferred accessing sequence of the present invention, with the order of the steps being depicted by the encircled numbers (①, ②, ③, etc.). As shown in FIG. 6, when accessing the even numbered cylinders (0, 2, etc.), the top recording surfaces of the disks are accessed first, and these top surfaces are accessed in ascending order by the even numbered head addresses (i.e., step 1 using head 0, followed by step 2 using head 2, followed by step 3 using head 4, and finishing with step 4 using head 6). Next, the bottom recording surfaces are accessed in descending order by the odd numbered head addresses (i.e., step 5 with head 7, step 6 with head 5, step 7 with head 3, and step 8 with head 1).

However, in the case of the odd numbered cylinders, the bottom recording surfaces of the disks will be accessed first, where these surfaces are accessed in ascending order by the odd numbered head addresses (as depicted by steps 9–12 of FIG. 6). It should be noted that when progressing from step 8 to step 9, although there is a cylinder change (cylinder 0 to cylinder 1), there is no head change because there is no change in recording surface.

After all of the bottom recording surfaces on the first odd-numbered cylinder have been accessed (i.e., after step 12 is completed), the top recording surfaces on the same cylinder are accessed, whereas these surfaces are accessed in descending order by the even numbered head addresses (steps 13–16). Upon completion of step 16, there is another cylinder change (from cylinder 1 to cylinder 2), as depicted by step 17. Once again, as there is no change in recording surface, there is no head change at this cylinder change. The process then continues for cylinder 2 as outlined above for the first even numbered cylinder (cylinder 0). If additional disk space is still necessary, the process continues by accessing the adjacent odd numbered cylinders and then the adjacent even numbered cylinders in the manner just described for each type of cylinder. It should be noted that although the process began with an even numbered cylinder in the example of FIG. 6, it could have easily began with an odd numbered cylinder, and it would have progressed in a similar manner to that described above. Furthermore, it is not always necessary to begin with the top recording surfaces. Instead, the bottom surfaces may be accessed first, followed by the top surfaces, as long as both sets of surfaces (the top and bottom surfaces) are accessed prior to moving to an adjacent cylinder.

Turning now to FIG. 7, this figure shows the address conversion table for a first embodiment of the present invention. As can be seen from the figure, the physical location (designated by cylinder number, the head number and the sector number) is provided for each logical block address (LBA).

In the prior art, when a change is made to a track that is located on a different surface, the head addresses also change by an increase or decrease of one (i.e., from head 0 to head 1, from head 1 to head 2, etc.). In contrast to this, that is, in contrast to alternately changing between the top and bottom surfaces of the disks, in this invention, with the exception of the change from head 6 to head 7, head addresses change by an increase or a decrease of two (i.e., from head 0 to head 2, from head 5 to head 3, etc.). In other words, the difference between the prior art and this invention is that in this invention, the same surfaces (i.e., either the top surfaces or the bottom surfaces) of a plurality of disks is accessed continuously.

The operation of the disk drive device of this invention will be described below based on the commands that are issued by the upper level device 2 while referring primarily to FIG. 5. When it is necessary for the upper level device 2 to write data to the disks 1, the upper level device 2 issues a write command to the disk drive device. The write command contains the lead off logical address of the write data.

When the hard disk controller 11 of the disk drive device receives the write command, it performs a logical operation upon the logical address of the write data, which is contained in the write command. Thus, this operation produces the logical block address (LBA). In the address conversion table 12 (one example of which is shown in FIG. 7), the logical block address and the physical address are correlated. After the logical block address has been produced, the physical address can be determined by referring to the address conversion table 12.

Once the physical address has been determined, the hard disk controller 11 can then command the heads 5-1 to 5-8 to move to the track (cylinder) that has been designated by the referenced physical address. When the heads 5-1 to 5-8 are on the designated track, the write data will be written to the disk 1 from the referenced physical address in the accessing sequence described above while referring to FIG. 6.

When the upper level device 2 needs to read data that has been written to the disk 1, the upper level device 2 issues a read command to the disk drive device. The read command contains a logical address, which is the address of where the relevant write data has been written on the virtual disk.

When the disk controller 11 of the disk drive device receives the read command from the upper level device 2, a logical operation is performed on the logical address contained in the read command (similar to the logical operation performed when receiving a write command), and the logical block address is calculated. The disk controller 11 will then reference the address conversion table 12 (such as the table shown in FIG. 7) to determine the physical address that corresponds to that particular logical block address.

The disk controller then issues a seek command to the actuator positioning means 9, whereby heads 5-1 to 5-8 are moved to the track (cylinder) that has been designated by the referenced physical address. When heads 5-1 to 5-8 are on the designated track, data is read from the designated physical address region according to the accessing sequence described above while referring to FIG. 6. The data that is read is transferred to the upper level device 2 through the disk controller 11 and the data bus controller 13.

Figure 8:
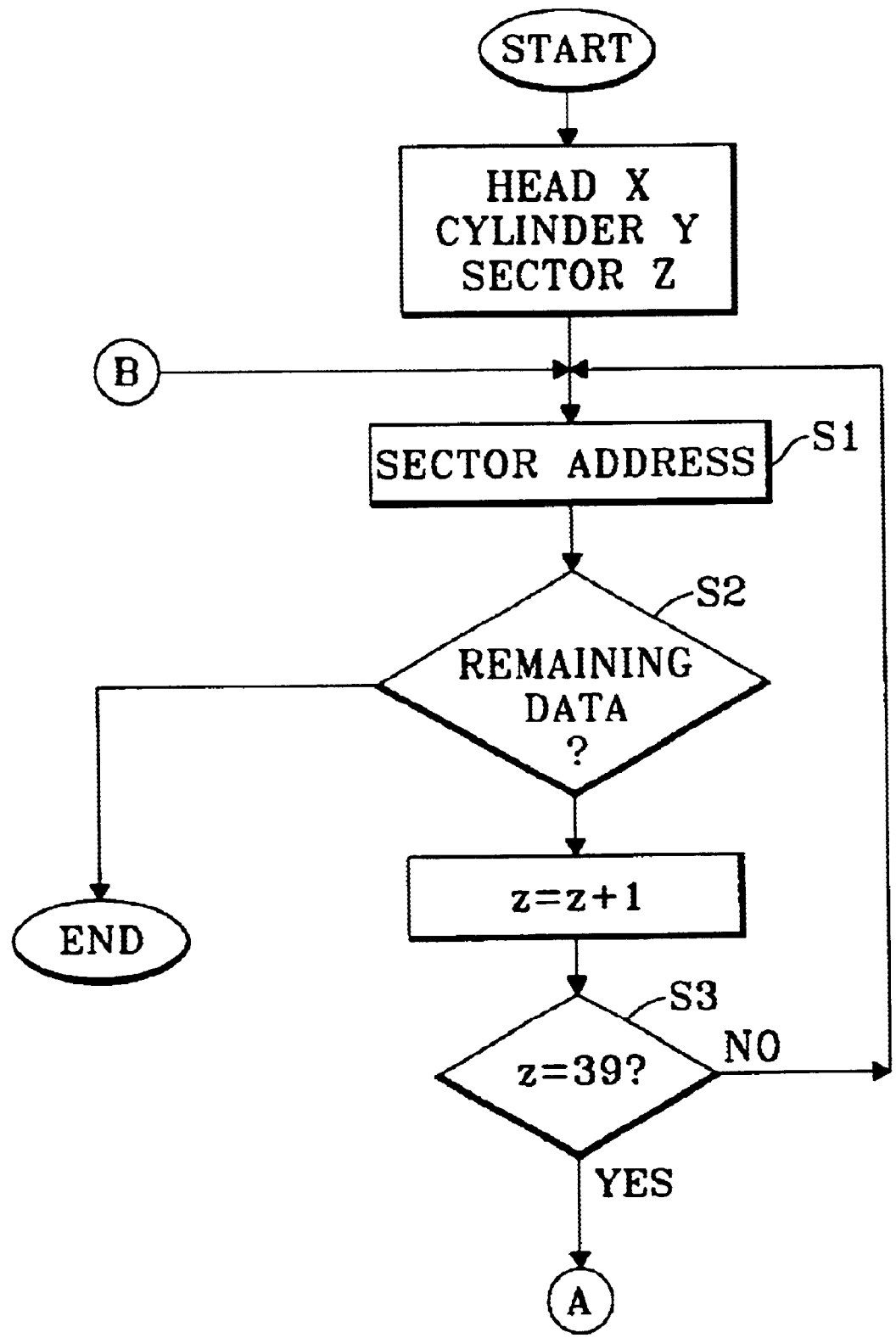
FIG. 8 is a flow chart of the access control of the present invention.

FIG. 8 is a flow chart of the accessing sequences of the read and write operations described above. In step S 1, when the head is on the track, access will take place in the region defined by the physical address (head x, cylinder y, sector z) obtained by referencing the conversion table 12 (such as the table shown in FIG. 7). In step S2, if all of the data has not been accessed within the single physical address from step S1, the process continues to step S3 so that the next sector can be accessed. On the other hand, if no additional data remains to be accessed, the access of that sequential data ends.

In step S3, a check is made to determine whether the sector address to be accessed next is the last sector on that track (which in this example is sector 39). If the last sector has not been reached, the process continues by accessing the next sector of the track currently being accessed. On the other hand, if the last sector (sector 39 in this example) has been reached, a change in heads will take place. This head change process is described below while referring to FIG. 9.

Figure 9:
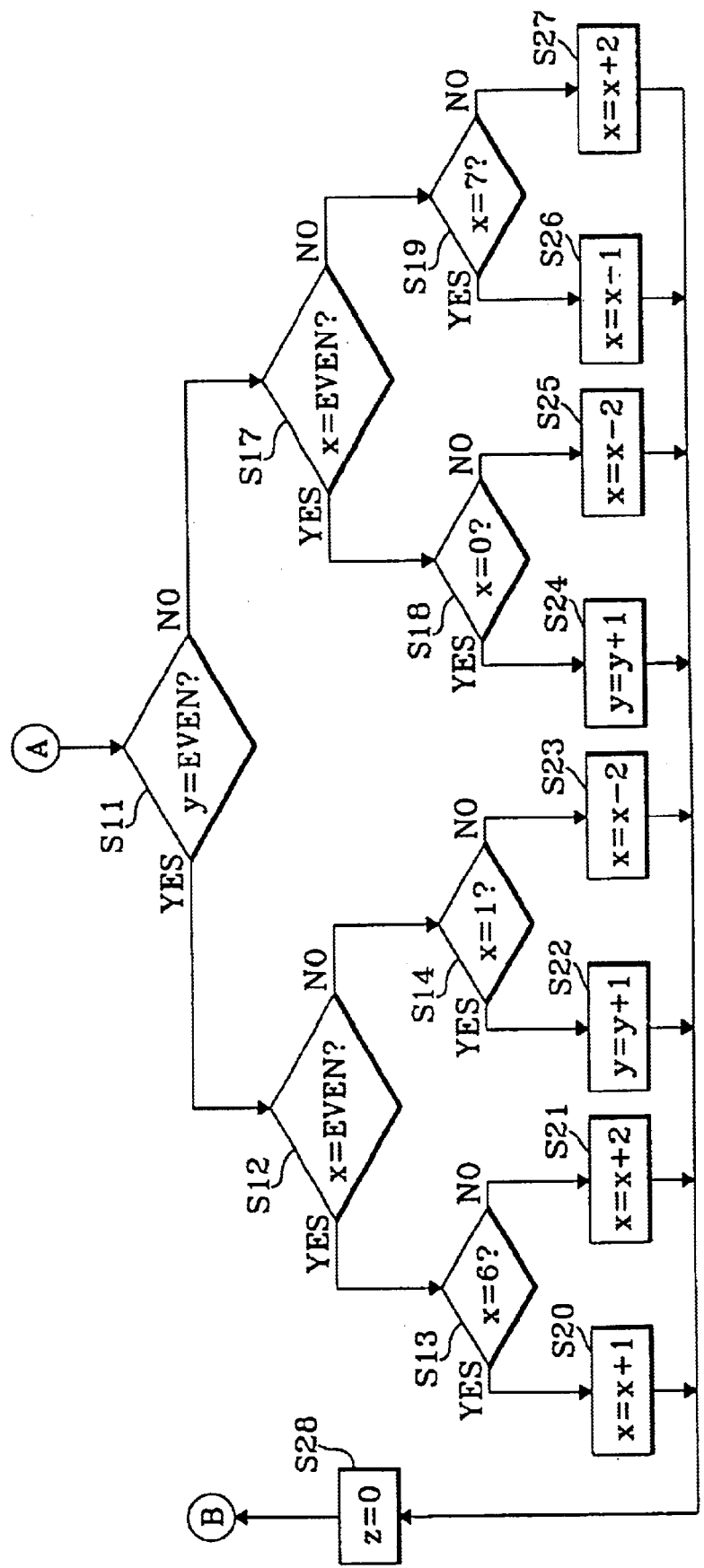
FIG. 9 is a flow chart of the control of head changes in the present invention.

FIG. 9 shows a flow chart of an access control process that includes a head change. In step S11, whether the cylinder address (y) being accessed has an even numbered cylinder address or an odd numbered cylinder address is determined. This step is performed because the direction of the head change differs depending on whether the cylinder address is an even number or an odd number. If the cylinder address is an even number, the process continues to step S12, and if the cylinder address is an odd number, the process continues to step S17. In this preferred embodiment, if the cylinder address (y) is an even number, the top recording surfaces are accessed first, followed by the bottom surfaces. On the other hand, if the cylinder address is an odd number, the bottom surfaces are accessed first, followed by the top surfaces (as shown in FIG. 6). However, it should be noted that it is contemplated that the access order can be reversed (i.e., for even numbered cylinders the bottom surfaces are accessed first and then the top surfaces, and for odd numbered cylinders the top surfaces are accessed first followed by the bottom surfaces).

If step S11 determines that the cylinder address (y) is an even number, the process continues to step S12 where it is determined whether the head address (x) is an even number of an odd number. If the head address is an even number, the process continues to step S13, where it is determined whether the head address equals 6 (i.e., the second to last head). If it is determined that x=6, then the value of the head address (x) is increased by one (x=x+1), as indicated by step S20. In this manner, as shown in FIG. 6, the head address being accessed changes from reading a top recording surface with head 6 to reading a bottom recording surface with head 7, since head 6 is the second to last head in the series. In contrast, if it is determined in step S13 (FIG. 9) that x≠6, then the value of the head address is increased by two (x=x+2), as indicated by step S21. In this manner, the head being accessed is increased by two, but does not change from a top surface to a bottom surface. In other words, if head 6 (which corresponds to the bottommost disk, 1-4) is being accessed, the head will change to access the head at the bottom surface (head 7) of that same disk (step S20). However, if the disk being accessed is not the bottommost disk, the head will change to access the head of the top surface (head x+2) of the disk immediately below the disk currently being accessed (step S21). For example, if head 0 (of FIG. 6) were being accessed, step S13 determines that 0≠6, so the process continues to step S21, where the head address is increased by two (2) to a new head address of 2 (2=0+2). The process continues in this manner until head 6 is reached, at which point step S20 is followed, as described above.

If step S12 determines that the head address (x) is an odd number, the process continues to step S14, where it is determined whether the head address equals 1 (i.e., the uppermost head, which is on disk 1-1). If it is determined that x=1, then the actuator is driven and the value of the cylinder address (y) is increased by one (y=y+1), as indicated by step S22. In this manner, access moves to the next cylinder. However, no head change occurs, as shown by the FIG. 6 example when the process progresses from step 8 to step 9.

In contrast, if step S14 determines that the head being accessed is not on the bottom recording surface of the uppermost disk (i.e., if it is not head 1 on disk 1-1 of FIG. 6), the process continues to step S23. In step S23, the head changes to access the head on the bottom recording surface of the disk immediately above the head currently being accessed (head m–2). Thus, for example, if head 5, which is on disk 1-3 (of FIG. 6) is currently being accessed, the determination of step S14 (of FIG. 9) reveals that 5≠1, so the process continues to step S23, where access changes from head 5 to head 3 (3=5–2). Head 3 is on disk 1-2, which is the disk immediately above disk 1-3 and, more specifically, head 3 is on the bottom recording surface of disk 1-2.

The following discussion relates to the case when step S11 determines that the address of the cylinder (y) being accessed is an odd numbered cylinder, in which case the process continues to step S17. In step S17, a determination is made as to whether the head (x) being accessed is an even numbered head or an odd numbered head. If step S17 determines that the current head is an even numbered head, the process continues to step S18, but if it is an odd numbered head, the process continues to step S19.

Assuming that step S17 has determined the head being accessed to be an even numbered head, step S18 then determines if the head being accessed is the head on the top surface of the uppermost disk (i.e., head 0 on disk 1-1 of FIG. 6). If the answer to this inquiry is yes (i.e., if x=0), then the process continues to step S24, which results in a cylinder change, but not a head change. More specifically, in step S24, the actuator is driven to move head 0 to the adjacent cylinder (cylinder y+1). One example of step S24 is shown in FIG. 6 when head 0 on cylinder 1 is moved to cylinder 2 during steps 16 and 17.

On the other hand, if step S18 determines that the disk being accessed is not the upper most disk (i.e., x≠0), then the process continues to step S25 in which the head changes to the head on the top recording surface of the disk immediately above the current disk (head x–2). One example of this portion of the process is depicted by steps 14 and 15 of FIG. 6, where access changes from head 4 to head 2, but remains within cylinder 1.

Referring back to step S17 (of FIG. 9), if it is determined in this step that the accessing head (x) is an odd numbered head, the process moves along to step S19. In step S19, a determination is made as to whether the head being accessed is on the bottommost disk (i.e., head 7 on disk number 1-4 of FIG. 6). If the bottommost disk is being a accessed (i.e., if x=7), then the process continues to step S26 whereby the head changes to the head on the top surface of the same disk (head 6), which results from the equation x=x–1 (6=7–1). Step S26 of FIG. 9 is depicted by steps 12 and 13 of FIG. 6.

On the other hand, if step S19 of FIG. 9 determines that the disk being accessed is not the bottommost disk, (i.e., if x≠7 in this example), then the process continues to step S27 in which the head being accessed changes to the head at the bottom recording surface of the disk immediately below the current head (x=x+2). For example, if head 5 of FIG. 6 is being accessed, step S19 determines that 5≠7, so the process continues to step S27, whereby the accessing head changes from head 5 to head 7 (steps 11 and 12 of FIG. 6), which is arrived at from the equation x=x+2 (7=5+2).

After any one of steps S20, S21, S22, S23, S24, S25, S26 or S27 (all of FIG. 9) is completed, the process continues to step S28. This step, which takes place after there has been either a head change or a cylinder change, returns the accessing process to sector zero (z=0) so that any continued access takes place in sequence beginning with sector zero. The steps recited above are repeated until the data being accessed is either completely written or completely read.

Figure 10:
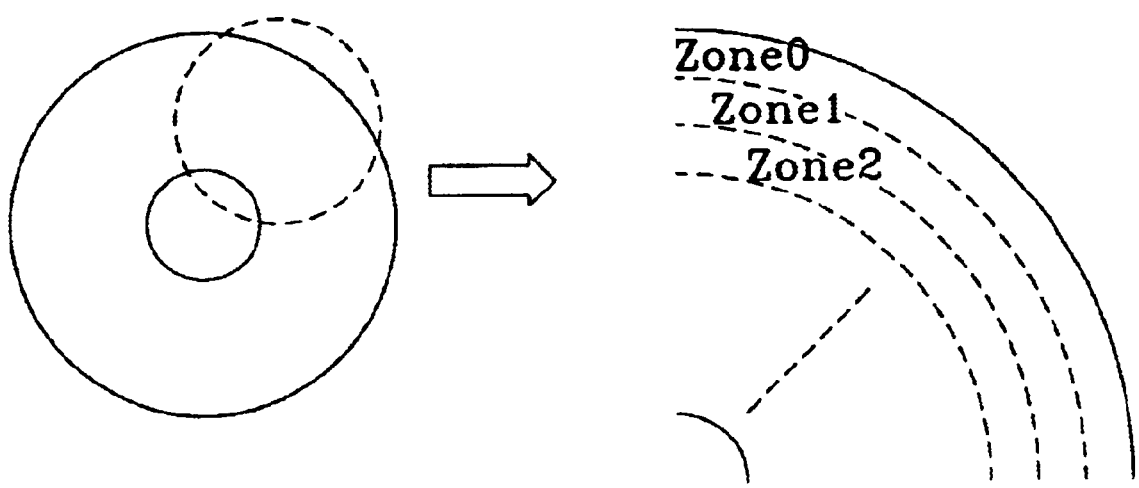
FIG. 10 shows the zone distribution that is incorporated into the second embodiment of the present invention.

A second embodiment of the present invention will be described next, while referring to FIGS. 10 and 11. As shown in FIG. 10, the recording surfaces of the disks are divided into a plurality of zones in the radial direction. Each zone preferably contains 100 cylinders. If the disks are rotated at a fixed angular speed, there will be a difference in the linear velocity between the outer circumference and inner circumference of the disk. More specifically, the linear velocity increases when moving from the inner circumference to the outer circumference. For this reason, in this second embodiment, either the recording frequency or the rotational speed is varied depending upon the radial location of the track being accessed. In particular, if the rotational speed is to be varied, the further out (radially) a track is located, the more the rotational speed is decreased.

FIG. 11 shows address conversion table 12' of the second embodiment of this invention. In this embodiment, address conversion table 12' is substituted for address conversion table 12 of FIG. 5, otherwise the hardware configuration in this embodiment is the same as that shown in FIG. 5. In this second embodiment, the relationship between the physical address allocation of the disks and the correlation between the logical addresses and physical addresses are the same as for the address conversion table of the first embodiment, which is depicted in FIG. 7. However, in the second embodiment, the zone number of each physical address is also stored in the address conversion table, as shown in FIG. 11.

The access process of the second embodiment operates as follows. If the hard disk controller 11 receives an access command from the upper level device 2, the address conversion table 12' will be referenced for the physical address and the zone number of the physical address of the location to be accessed. The hard disk controller 11 then sends a command to the actuator positioning means 9 so that head 5 can be moved to the track designated by the physical address. In addition, the hard disk controller 11 sends a command to the head changing means 10 so that the head designated by that address can be selected. Furthermore, the hard disk controller 11 also sends a command to the SPM control means 8 so that the disk 1 can be rotated at the speed that corresponds to the zone number to be accessed. Next, depending upon whether a read or a write command has ben issued, data for the frequency that corresponds to the zone number will either be sent to the head, or such data will be read from the head.

Preferably, in the second embodiment of the present invention, each zone is composed of an even number of cylinders so that the relationship between the physical cylinders and the logical cylinders does not become inverted.

Figure 12:
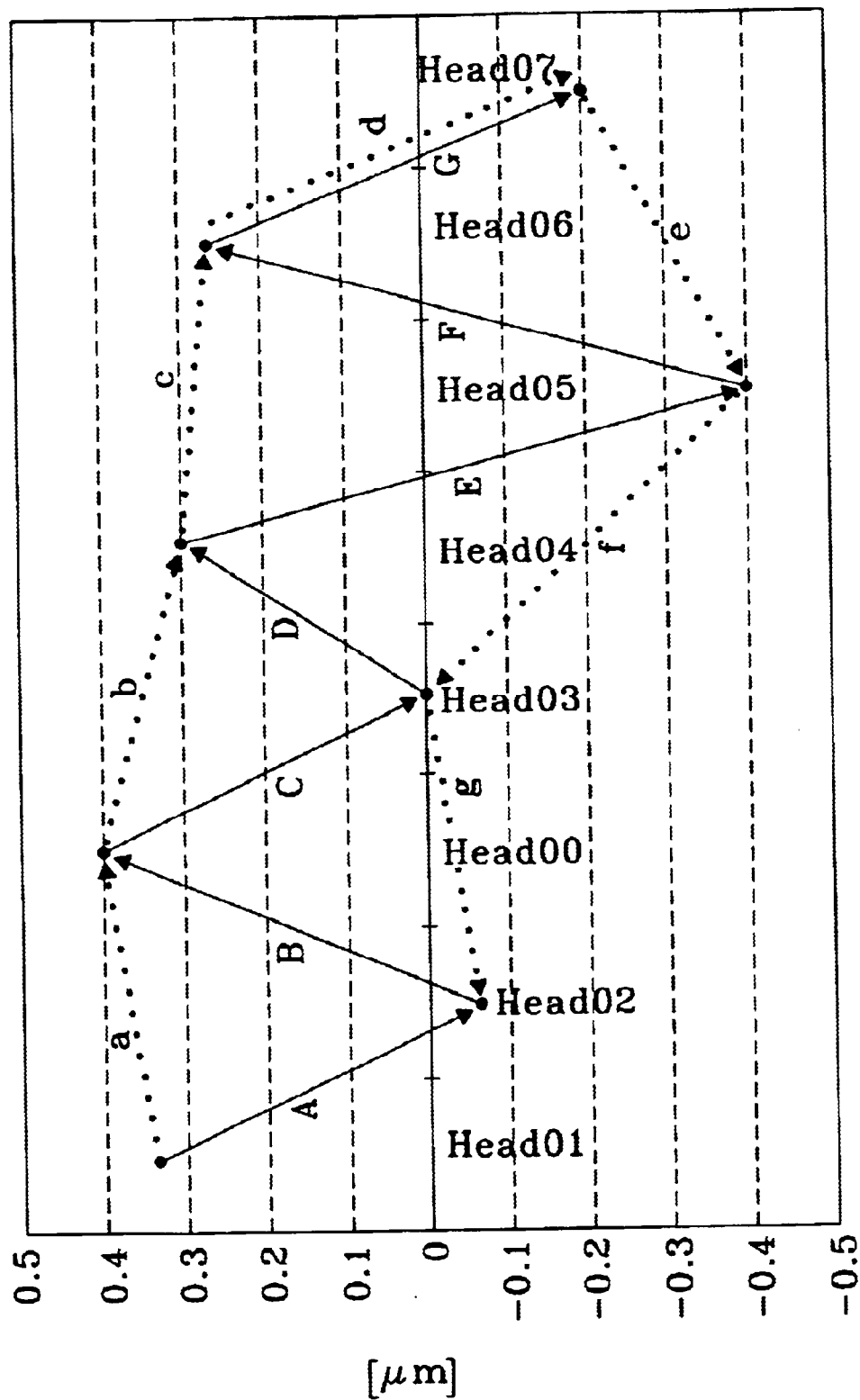
FIG. 12 shows a graph of the relative amounts of head offset of both the prior art and the present invention.

FIG. 12 shows a graph that indicates the amount of relative offset of the heads in the disk drive device of the present invention, which, in this example, is equipped with four disks. In the example shown in FIG. 12, the amount of positional offset for each head relative to a certain reference position has been measured.

As shown in FIG. 12, the relative amount of offset among heads that access only the top surfaces of the disks (with even numbered head addresses) is relatively small. Similarly, the relative amount of offset among heads that access only the bottom surfaces of the disks (with odd numbered head addresses) is also relatively small. However, the amount of relative offset between a head that accesses the top surface and a head that accesses the bottom surface is relatively large.

Figure 3:
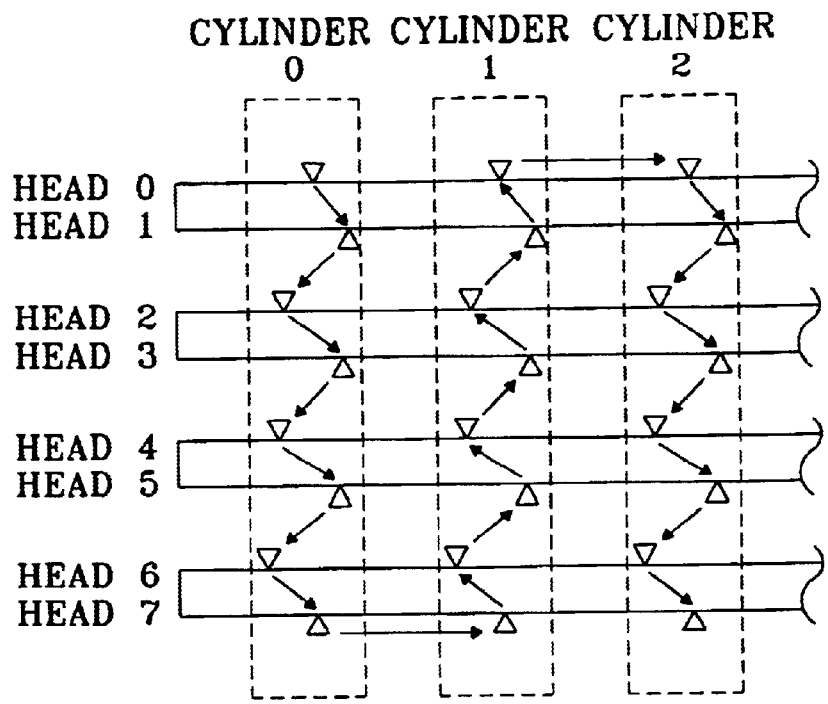
FIG. 3 shows another example of a prior art accessing sequence for head movement, which is a modification of the FIG. 2 sequence.
Figure 4:
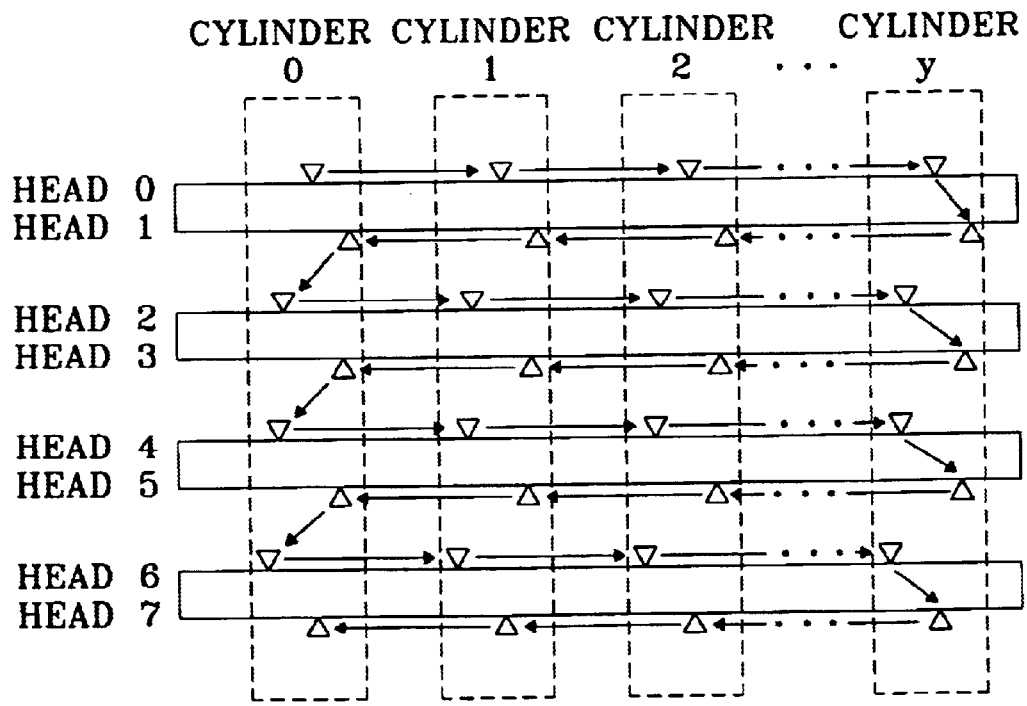
FIG. 4 shows a third example of a prior art accessing sequence that is referred to as the surface movement method.

FIG. 12 shows a comparison of the relative offsets of the present invention (in which most head changes are from a top surface to another top or from a bottom surface to another bottom surface) with a prior art device in which the heads generally alternate between a top surface and a bottom surface. In FIG. 12, the head changes of the present invention are represented by the dotted arrows. On the other hand, the head changes of the access methods of the prior art, such as those shown in FIGS. 2 and 3, are indicated by the solid arrows. Thus, as can be seen from FIG. 12, the relative offsets of the present invention are generally much smaller than the relative offsets of the prior art.

FIG. 13 is a bar graph that shows the relative amount of offset between adjacent heads (head x and head x+1) of many prior art devices. The bar graph of FIG. 13 was created based on the results shown in FIG. 12, and is equivalent to the amount of head movement when heads change in the prior art accessing sequences depicted in FIGS. 2 and 3.

FIG. 14 is a bar graph that shows the amount of head movement when heads change in the present invention. In FIG. 14, the change from head 6 to head 7 indicates a change from a head that accesses the top surface of a disk to a head that accesses the bottom surface of a disk. In this case, the amount of head movement is relatively large. However, when changing between top surface heads or between bottom surface heads, the head movement is maintained at a relatively small amount. The bar graph of FIG. 14 also shows a relatively large head movement when going from head 5 to head 3. However, it should be noted that this bar graph represents the test data from a single sample disk, where the result from this head change is essentially an aberration. Normally, there will only be a relatively small mount of head movement when changing from head 5 to head 3.

Based on the results shown in FIGS. 13 and 14, it is clear that the amount of head movement using the head changing method employed in the present invention can be relatively small when compared with that of prior art methods. For example, the total amount of head movement when changing all of the heads in one cylinder is approximately 3.40 microns when using the head movement method of the prior art shown in FIG. 2 and FIG. 3. In contrast, when employing the head changing method of the present invention, the total amount of head movement can be reduced to approximately 1.37 microns, which is less than half of that of the prior art methods of FIGS. 2 and 3.

Use of the present invention results in the following benefits. First, because the heads of the present invention are changed continuously in groups of disk top surface heads and disk bottom surface heads, the amount of head movement when the heads change is limited to a minimum, which allows the head skew to be small. Additionally, because the cylinder changes are made on the same surface of the disk, the head does not change when there is a cylinder change. Further, the distance of the head movement is fixed within the range of track pitch accuracy, and the cylinder skew is held down to a minimum. As a result, the transfer rate is improved.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A disk drive device comprising:
   a plurality of disks that are arranged concentrically about a central axis, wherein each of said disks includes a plurality of concentric tracks of different diameters and each of said disks also includes a top surface and a bottom surface;
   a plurality of cylinders defined by a combination of one of said tracks from each of said disks, wherein each cylinder consists of a plurality of tracks of a single diameter;
   a plurality of heads associated with said plurality of disks, wherein each of said heads is configured and arranged to access either a top surface or a bottom surface of one of said disks; and
   an upper level device for issuing access commands directing said heads to access said disks;

wherein when an access command is issued that requires sequential data to be accessed on more than one track, an access sequence is followed in which at least two of said top surfaces on different disks of the same cylinder are accessed directly after each other, or, at least two of said bottom surfaces on different disks of the same cylinder are accessed directly after each other.

2. The disk drive device as defined in claim 1, wherein said access sequence includes first accessing either a top surface set, which consists of all of the top surfaces on all of the disks of a single cylinder, or a bottom surface set, which consists of all of the bottom surfaces on all of the disks of a single cylinder, followed by accessing the remaining set chosen from said bottom surface set and said top surface set.

3. The disk drive device as defined in claim 2, wherein after accessing the entire top surface set and the entire bottom surface set of a single cylinder, the access sequence continues by accessing an adjacent cylinder on the same surface of the same disk accessed last in the previous cylinder.

4. The disk drive device as defined in claim 2, wherein when said access sequence begins with said top surface set on one cylinder, the access sequence continues to an adjacent cylinder by first accessing said bottom surface set of the adjacent cylinder, and wherein when said access sequence begins with said bottom surface set on one cylinder, the access sequence continues to an adjacent cylinder by first accessing said top surface set of the adjacent cylinder.

5. The disk drive device as defined in claim 1, wherein after accessing the last access location on one cylinder, the first access location on the adjacent cylinder to be accessed is located on the same surface of the same disk.

6. The disk drive device as defined in claim 1, wherein when said access sequence begins by first accessing a top surface on one cylinder, the access sequence continues to an adjacent cylinder by first accessing a bottom surface of the adjacent cylinder, and wherein when said access sequence begins by first accessing a bottom surface on one cylinder, the access sequence continues to an adjacent cylinder by first accessing a top surface of the adjacent cylinder.

7. The disk drive device as defined in claim 1, further comprising:
   a motor for rotating said plurality of disks about said central axis; and
   a motor control means for controlling the rotational speed of said plurality of disks;
   wherein each of said disks is divided up into a plurality of zones, with each zone including a plurality of tracks therein; and
   further wherein a different rotational speed is assigned to each zone such that said motor control means adjusts the rotational speed of said motor to a speed corresponding to the zone being accessed.

8. The disk drive device as defined in claim 1, further comprising:
   a motor for rotating said plurality of disks about said central axis; and
   a motor control means for controlling the rotational frequency of said plurality of disks;
   wherein each of said disks is divided up into a plurality of zones, with each zone including a plurality of tracks therein; and
   further wherein a different rotational frequency is assigned to each zone such that said motor control means adjusts the rotational frequency of said motor to a frequency corresponding to the zone being accessed.

9. An access sequence for accessing sequential data on a plurality of disks, whose steps are only performed up to the point where all of the sequential data has been accessed, wherein said access sequence comprising the steps of:
   a first step of accessing a first surface on a first disk; and
   a second step of accessing a second surface on a second disk directly after accessing said first surface, wherein said first surface and said second surfaces are either two top surfaces on different disks or two bottom surfaces on different disks, and further wherein said first step and said second step are both performed upon a single cylinder.

10. The access sequence as defined in claim 9, wherein:
    if said first step and said second step were both performed upon top surfaces, any remaining top surfaces within the same cylinder accessed in said first and second steps are accessed in a third step;
    if said first step and said second step were both performed upon bottom surfaces, any remaining bottom surfaces within the same cylinder accessed in said first and second steps are accessed in a third step.

11. The access sequence as defined in claim 10, wherein:
    if only top surfaces have been accessed in said first through third steps, a bottom surface within the same cylinder accessed in said first through third steps is accessed in a fourth step;
    if only bottom surfaces have been accessed in said first through third steps, a top surface within the same cylinder accessed in said first through third steps is accessed in a fourth step.

12. The access sequence as defined in claim 9, wherein
    if said first step and said second step were both performed upon top surfaces, the access sequence continues by accessing any remaining top surfaces within the same cylinder, then by accessing the bottom surfaces of the same cylinder, followed by accessing the bottom surface of an adjacent cylinder without performing a head change, then by accessing the remainder of the bottom surfaces on said same adjacent cylinder, followed by accessing the top surfaces on the same adjacent cylinder, and finally by continuing in the same manner to additional adjacent cylinders by alternating between either accessing bottom surfaces first or accessing top surfaces first such that no head changes occur upon changing cylinders;
    if said first step and said second step were both performed upon bottom surfaces, the access sequence continues by accessing any remaining bottom surfaces within the same cylinder, then by accessing the top surfaces of the same cylinder, followed by accessing the top surface of an adjacent cylinder without performing a head change, then by accessing the remainder of the top surfaces on said same adjacent cylinder, followed by accessing the bottom surfaces on the same adjacent cylinder, and finally by continuing in the same manner to additional adjacent cylinders by alternating between either accessing top surfaces first or accessing bottom surfaces first such that no head changes occur upon changing cylinders.

* * * * *